(12) United States Patent
Fukuda

(10) Patent No.: US 9,594,895 B2
(45) Date of Patent: Mar. 14, 2017

(54) INFORMATION PROCESSING SYSTEM AND AUTHENTICATION INFORMATION PROVIDING METHOD FOR PROVIDING AUTHENTICATION INFORMATION OF AN EXTERNAL SERVICE

(71) Applicant: Yasuharu Fukuda, Tokyo (JP)

(72) Inventor: Yasuharu Fukuda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/640,092

(22) Filed: Mar. 6, 2015

(65) Prior Publication Data

US 2015/0264039 A1 Sep. 17, 2015

(30) Foreign Application Priority Data

Mar. 11, 2014 (JP) ................................ 2014-047969

(51) Int. Cl.
| | |
|---|---|
| *G06F 21/45* | (2013.01) |
| *G06F 21/41* | (2013.01) |
| *G06F 21/33* | (2013.01) |
| *G06F 21/60* | (2013.01) |
| *H04L 12/22* | (2006.01) |

(52) U.S. Cl.
CPC ............ *G06F 21/41* (2013.01); *G06F 21/335* (2013.01); *G06F 21/608* (2013.01); *G06F 2221/2101* (2013.01)

(58) Field of Classification Search
None
See application file for complete search history.

(56) References Cited

U.S. PATENT DOCUMENTS

| | | | | |
|---|---|---|---|---|
| 7,725,924 | B2* | 5/2010 | Terao | ..................... H04L 63/083 |
| | | | | 713/182 |
| 8,271,536 | B2* | 9/2012 | Amradkar | ........... H04L 63/0807 |
| | | | | 707/802 |
| 2003/0101116 | A1* | 5/2003 | Rosko | ..................... G06F 21/41 |
| | | | | 705/35 |
| 2005/0198494 | A1 | 9/2005 | Ishibashi | |

(Continued)

FOREIGN PATENT DOCUMENTS

| | | |
|---|---|---|
| JP | 2001-209611 | 8/2001 |
| JP | 2005-202923 | 7/2005 |

*Primary Examiner* — Venkat Perungavoor
(74) *Attorney, Agent, or Firm* — IPUSA, PLLC

(57) ABSTRACT

An information processing system includes an electronic device; a service providing system including information processing devices connected to the image forming device via a network; a single sign on unit configured to send a request from the electronic device to the service providing system, to acquire authentication information of an external service that performs a process in cooperation with an application operating in the image forming device; an access control unit configured to receive the request from the single sign on unit whose validity has been confirmed, based on a result obtained by using identification information of the single sign on unit, in the service providing system; and a data management unit configured to acquire the authentication information of the external service from a storage unit based on the request from the single sign on unit that is valid, and to provide the authentication information of the external service to the single sign on unit via the access control unit.

10 Claims, 19 Drawing Sheets

(56) References Cited

U.S. PATENT DOCUMENTS

| | | | | |
|---|---|---|---|---|
| 2008/0060070 A1* | 3/2008 | Uno | G06Q 30/0601 | 726/21 |
| 2010/0154041 A1* | 6/2010 | Dalzell | G06F 21/41 | 726/6 |
| 2011/0173688 A1* | 7/2011 | Nanaumi | G06F 21/31 | 726/8 |
| 2011/0265144 A1* | 10/2011 | Ikeda | G06F 21/608 | 726/3 |
| 2012/0092708 A1* | 4/2012 | Hayami | G06F 3/1204 | 358/1.15 |
| 2012/0240214 A1* | 9/2012 | Ogura | G06F 21/31 | 726/12 |
| 2013/0163027 A1* | 6/2013 | Shustef | H04L 63/0209 | 358/1.14 |
| 2014/0123236 A1* | 5/2014 | Hirata | H04L 63/0807 | 726/4 |

* cited by examiner

FIG.7

| TENANT ID |
|---|
| rico |
| rits |

FIG.8

| TENANT ID | USER ID | PASSWORD |
|---|---|---|
| rico | Rico | Password |
| Rico | User0002 | Password00 |
| rits | User0001 | Pass |

FIG.9

| MFP USER ID | TENANT ID | PASSWORD |
|---|---|---|
| satoh | Rico | password |
| tanaka | Rits | Password00 |

FIG.11

| APPLICATION ID | APPLICATION KEY |
|---|---|
| Commonsso | Key1 |
| Sdkapp1 | Key2 |

FIG.13

| TENANT ID | PASSWORD |
|-----------|----------|
| Rico | password |

FIG.15

| APPLICATION ID | TENANT ID | Key1 | Key2 | Key3 | Value |
|---|---|---|---|---|---|
| commonsso | rico | tanaka | TRANSLATION SERVICE | User_id | User0001 |
| commonsso | rico | tanaka | TRANSLATION SERVICE | password | Password00 |
| Printapp | rico | Yamada | Taroh | PRINT COLOR | COLOR |
| printapp | RJ | Tanaka | hanako | PRINT RESULT | COMBINE/DOUBLE-SIDED |
| commonsso | Rits | satoh | OPERATION FLOW SERVICE | User_id | User0003 |

FIG.17

| TENANT ID | USER ID | AUTHENTICATION TICKET |
|---|---|---|
| rico | User0001 | Ticket0001 |
| Rico | User0002 | Ticket0003 |

| Key3 | Value |
|---|---|
| User_id | User0001 |
| password | Password00 |

INFORMATION PROCESSING SYSTEM AND AUTHENTICATION INFORMATION PROVIDING METHOD FOR PROVIDING AUTHENTICATION INFORMATION OF AN EXTERNAL SERVICE

BACKGROUND OF THE INVENTION

1. Field of the Invention

The present invention relates to an information processing system and an authentication information providing method.

2. Description of the Related Art

Conventionally, there is known a proxy management method and an agent device, by which an agent device provided between a service provider device and a user device manages the information of the user device. In the conventional proxy management method and the agent device, the user's load of managing authentication information has been reduced (see, for example, Patent Document 1).

Patent Document 1: Japanese Laid-Open Patent Publication No. 2001-209611

In recent years, various external services have started to be provided by cloud computing, etc. As external services provided by cloud computing, etc., have become widespread, there have been cases where applications, which operate in an image forming apparatus such as a multifunction peripheral, perform processes in cooperation with external services.

In these cases, the user needs to perform a plurality of authentication operations in order to use a plurality of external services. Note that there is known a technique of a single sign on (SSO), which is for reducing the load of authenticating a user. By single sign on, the user does not need to execute another authentication operation after completing the sign on operation, i.e., after being authenticated.

However, there has been a problem in that when an image forming apparatus such as a multifunction peripheral and an external service cooperate with each other to perform a process, there has been a need to develop a cooperation function for cooperating with the external service, for each application operating in the image forming apparatus.

SUMMARY OF THE INVENTION

The present invention provides an information processing system and an authentication information providing method, in which one or more of the above-described disadvantages are eliminated.

According to an aspect of the present invention, there is provided an information processing system including an electronic device; a service providing system including one or more information processing devices that are connected to the electronic device via a network; a requesting unit configured to send a request from the electronic device to the service providing system, to acquire authentication information of an external service that performs a process in cooperation with an application operating in the electronic device; an access control unit configured to receive the request from the requesting unit whose validity has been confirmed, based on a result of confirming the validity of the requesting unit obtained by using identification information of the requesting unit, in the service providing system; and a data management unit configured to acquire the authentication information of the external service from a storage unit based on the request from the requesting unit whose validity has been confirmed, and to provide the authentication information of the external service to the requesting unit via the access control unit.

According to an aspect of the present invention, there is provided an authentication information providing method executed by an information processing system including an electronic device and a service providing system including one or more information processing devices that are connected to the electronic device via a network, the authentication information providing method including sending a request from a requesting unit of the electronic device to the service providing system, to acquire authentication information of an external service that performs a process in cooperation with an application operating in the electronic device; receiving the request from the requesting unit whose validity has been confirmed, based on a result of confirming the validity of the requesting unit obtained by using identification information of the requesting unit, in the service providing system; and acquiring the authentication information of the external service from a storage unit based on the request from the requesting unit whose validity has been confirmed, and providing the authentication information of the external service to the requesting unit.

BRIEF DESCRIPTION OF THE DRAWINGS

Other objects, features and advantages of the present invention will become more apparent from the following detailed description when read in conjunction with the accompanying drawings, in which:

FIG. 7 illustrates an example of a tenant information table;

FIG. 8 illustrates an example of a user information table;

FIG. 9 illustrates an example of a tenant authentication table;

FIG. 11 illustrates an example of an application information table;

FIG. 13 illustrates an example of a tenant authentication table;

FIG. 15 illustrates an example of a setting information table unique to an application;

FIG. 17 illustrates an example of an authentication ticket table;

DETAILED DESCRIPTION OF THE PREFERRED EMBODIMENTS

A description is given, with reference to the accompanying drawings, of embodiments of the present invention.

First Embodiment

System Configuration

Figure 1:
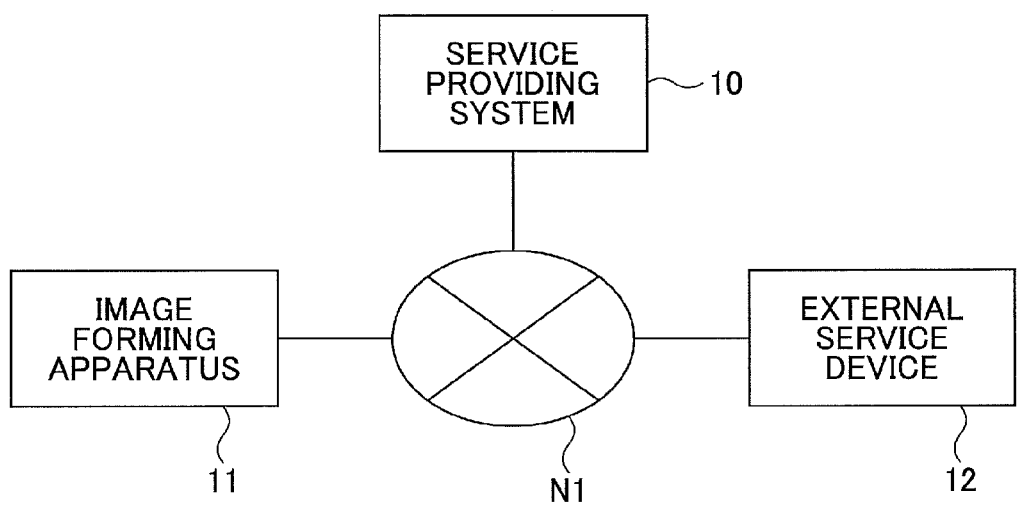
FIG. 1 illustrates a configuration of an example of an information processing system according to a first embodiment.

FIG. 1 illustrates a configuration of an example of an information processing system according to a first embodiment. The information processing system 1 illustrated in FIG. 1 includes a service providing system 10, an image forming apparatus 11, and an external service device 12, which are connected by a network N1 such as the Internet.

The image forming apparatus 11 is a device having an image forming function, such as a multifunction peripheral. The image forming apparatus 11 includes a means for performing wireless communication or a means for performing wired communication. The image forming apparatus 11 is a device for performing processes relevant to image forming, such as a multifunction peripheral, a copier, a scanner, a printer, a laser printer, a projector, and an electronic blackboard.

The example of the information processing system 1 illustrated in FIG. 1 includes the image forming apparatus 11 in which the application operates; however, any electronic device may be used, as long as an application for performing processes in cooperation with the external service device 12, can operate in the electronic device. Furthermore, the example of FIG. 1 includes one image forming apparatus 11; however, a plurality of image forming apparatuses 11 may be included.

The image forming apparatus 11 is able to provide, for example, a new application, by causing an application operating in the image forming apparatus 11 and the external service device 12 to cooperate with each other. For example, the information processing system 1 illustrated in FIG. 1 may translate a document scanned by the image forming apparatus 11, by using a translation service of the external service device 12, and send the document obtained as a translation result to a user by mail. The external service device 12 is a device for providing external services, such as a translation service and an online storage. Note that the external service device 12 may be a system that is realized by a plurality of information processing devices.

The service providing system 10 is realized by one or more information processing devices. The service providing system 10 stores authentication information for passing authentication needed for using the API (Application Programming Interface) of the external service device 12.

The authentication of the external service device 12 may be hidden as an internal process of the image forming apparatus 11. After registering the authentication information of the image forming apparatus 11 in the service providing system 10, the user of the image forming apparatus 11 is able to seamlessly (without having to input authentication information) use (single sign on) the external service device 12 from the image forming apparatus 11.

The authentication information of the external service device 12 stored in the service providing system 10 may be used from a plurality of image forming apparatuses 11. Therefore, the user of the image forming apparatus 11 is able to easily set up the image forming apparatus 11 for performing processes in cooperation with the external service device 12. Furthermore, in addition to the authentication information of the external service device 12, the service providing system 10 may store, for example, information specialized for an application operating in the image forming apparatus 11, such as translation conditions and print conditions.

Note that the configuration of the information processing system 1 illustrated in FIG. 1 is an example; the information processing system 1 may have other configurations.

<Hardware Configuration>

Figure 2:
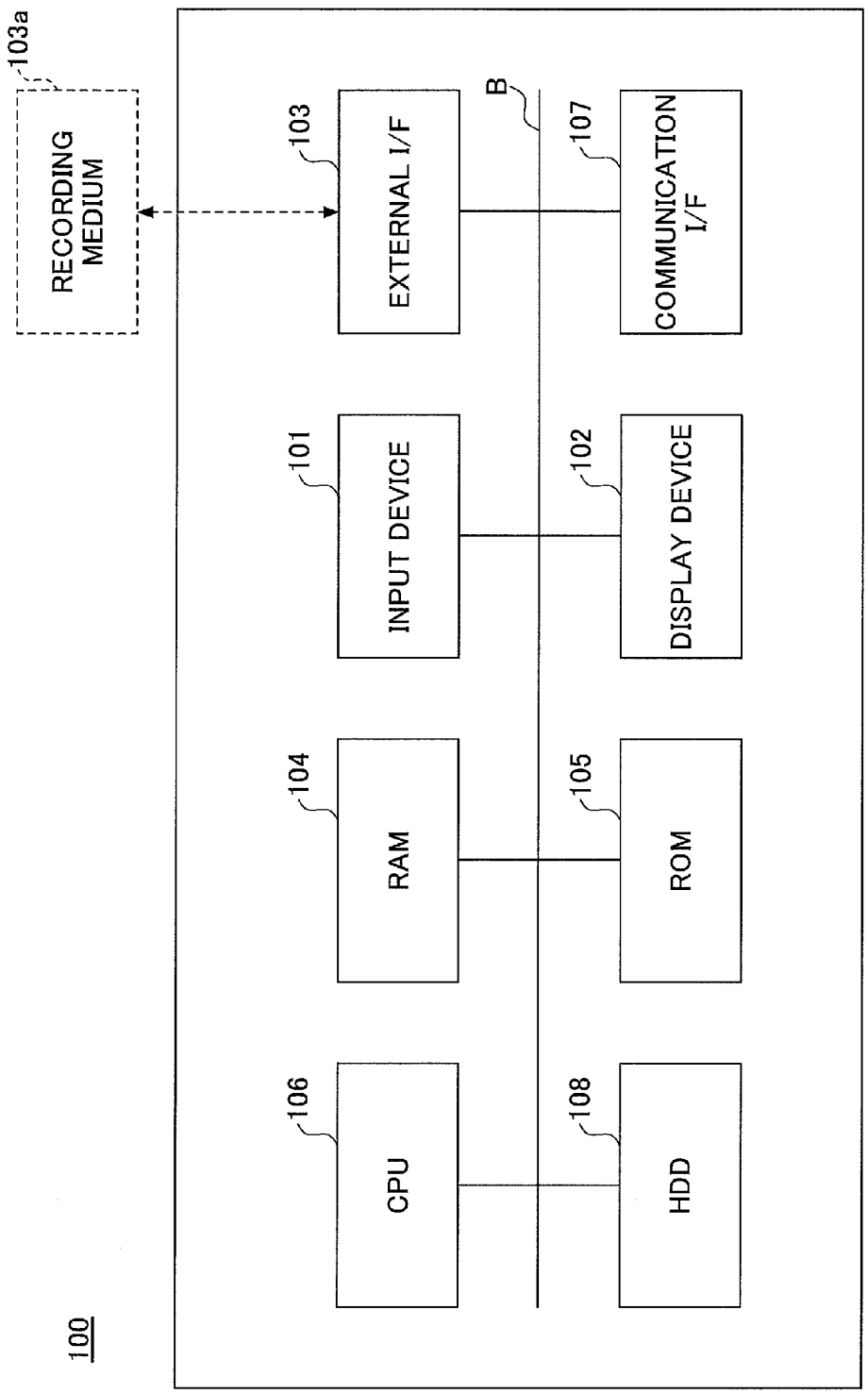
FIG. 2 illustrates a hardware configuration of an example of a computer.

The service providing system 10 and the external service device 12 illustrated in FIG. 1 is realized by a computer having a hardware configuration, for example, as illustrated in FIG. 2.

FIG. 2 illustrates a hardware configuration of an example of a computer. A computer 100 illustrated in FIG. 2 includes an input device 101, a display device 102, an external I/F 103, a RAM 104, a ROM 105, a CPU 106, a communication I/F 107, and a HDD 108, which are interconnected by a bus B.

The input device 101 includes a keyboard, a mouse, and a touch panel, and is used by the user for inputting various operation signals. The display device 102 includes a display, etc., and displays processing results obtained by the computer 100. Note that the input device 101 and the display device 102 may have a configuration of being connected and used when necessary.

The communication I/F 107 is an interface that connects the computer 100 to the network N1. Accordingly, the computer 100 is able to perform data communication via the communication I/F 107.

Furthermore, the HDD 108 is an example of a non-volatile storage device for storing programs and data. The stored programs and data include an OS that is the basic software for controlling the entire computer 100, and application software for providing various functions in the OS. Note that the computer 100 may use a drive device (for example, a solid state drive: SSD) using a flash memory as the storage medium, instead of the HDD 108.

The HDD 108 manages the stored programs and data by a predetermined file system and/or a DB. The external I/F 103 is an interface between the computer 100 and an external device. An example of the external device is a recording medium 103a.

Accordingly, the computer 100 is able to read and/or write in the recording medium 103a via the external I/F 103. Examples of the recording medium 103a are a flexible disk, a CD, a DVD, an SD memory card, and a USB memory.

The ROM 105 is a non-volatile semiconductor memory (storage device) that can store programs and data even after the power is turned off. The ROM 105 stores programs and data such as a BIOS that is executed when the computer 100 is activated, OS settings, and network settings. The RAM 104 is a volatile semiconductor memory (storage device) for temporarily storing programs and data.

The CPU 106 is a processor for controlling the entire computer 100 and realizing functions of the computer 100, by loading the programs and data from the storage devices such as the ROM 105 and the HDD 108, into the RAM 104, and executing processes. The service providing system 10 and the external service device 12 are able to realize various processes described below, by the hardware configuration of the computer 100.

Figure 3:
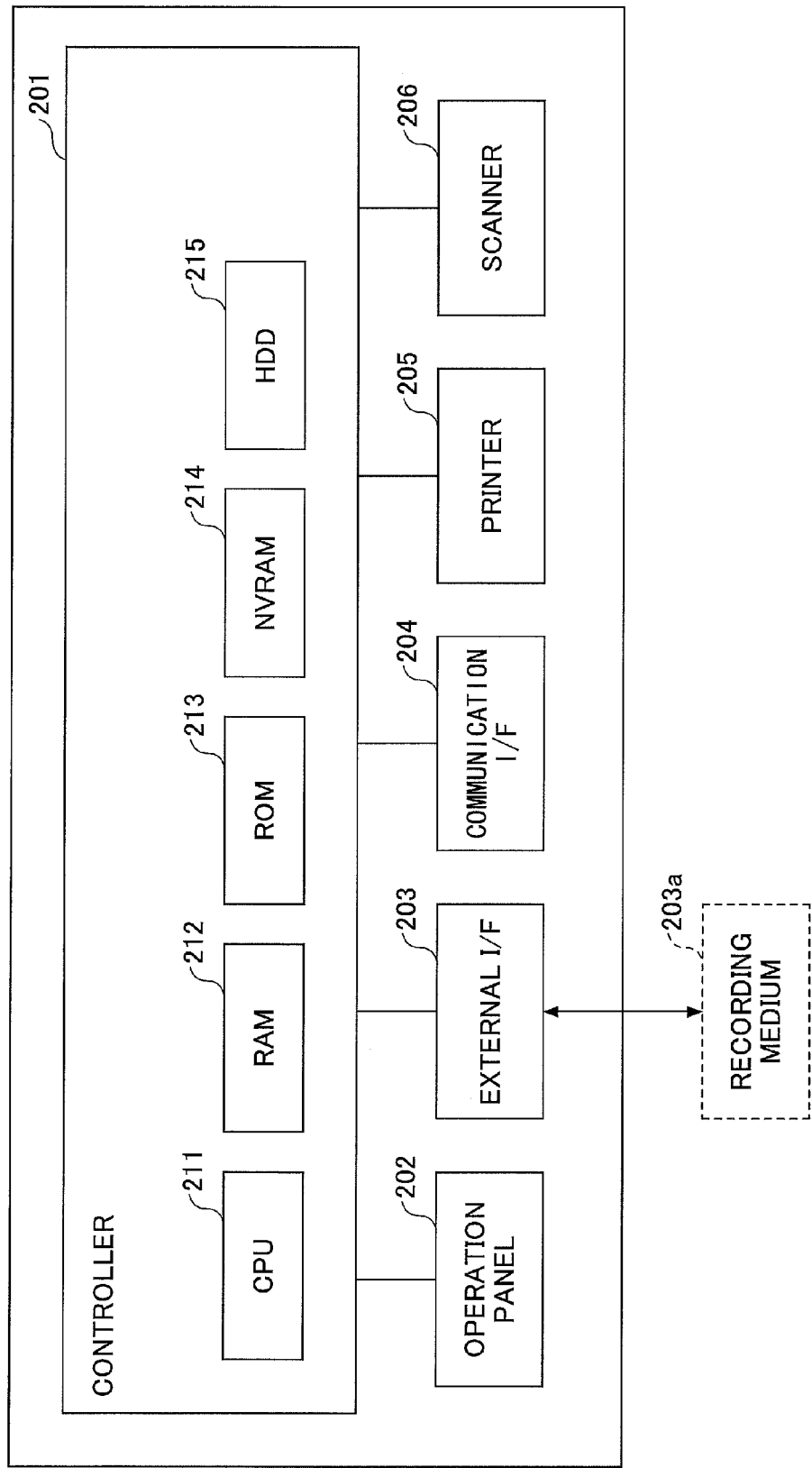
FIG. 3 illustrates a hardware configuration of an example of an image forming apparatus according to the first embodiment.

The image forming apparatus 11 illustrated in FIG. 1 is realized by a computer having a hardware configuration, for example, as illustrated in FIG. 3. FIG. 3 illustrates a hardware configuration of an example of the image forming apparatus 11 according to the present embodiment. The image forming apparatus 11 illustrated in FIG. 3 includes a controller 201, an operation panel 202, an external I/F 203, a communication I/F 204, a printer 205, and a scanner 206.

The controller 201 includes a CPU 211, a RAM 212, a ROM 213, a NVRAM 214, and a HDD 215. The ROM 213 stores various programs and data. The RAM 212 temporarily stores programs and data. The NVRAM 214 stores, for example, setting information. Furthermore, the HDD 215 stores various programs and data.

The CPU 211 controls the entire image forming apparatus 11 and realizes functions of the image forming apparatus 11, by loading the programs and data, setting information, from the ROM 213, the NVRAM 214, and the HDD 215, into the RAM 212, and executing processes.

The operation panel 202 includes an input unit for receiving input from a user, and a display unit for displaying information. The external I/F 203 is an interface between the image forming apparatus 11 and an external device. An example of the external device is a recording medium 203a. Accordingly, the image forming apparatus 11 is able to read and/or write in the recording medium 203a via the external I/F 203. Examples of the recording medium 203a are an IC card, a flexible disk, a CD, a DVD, an SD memory card, and a USB memory.

The communication I/F 204 is an interface that connects the image forming apparatus 11 to the network N1. Accordingly, the image forming apparatus 11 is able to perform data communication via the communication I/F 204. The printer 205 is a printing device for printing print data onto a sheet. The scanner 206 is a reading device for reading image data (electronic data) from an original document.

<Software Configuration>
<<Image Forming Apparatus>>

Figure 4:
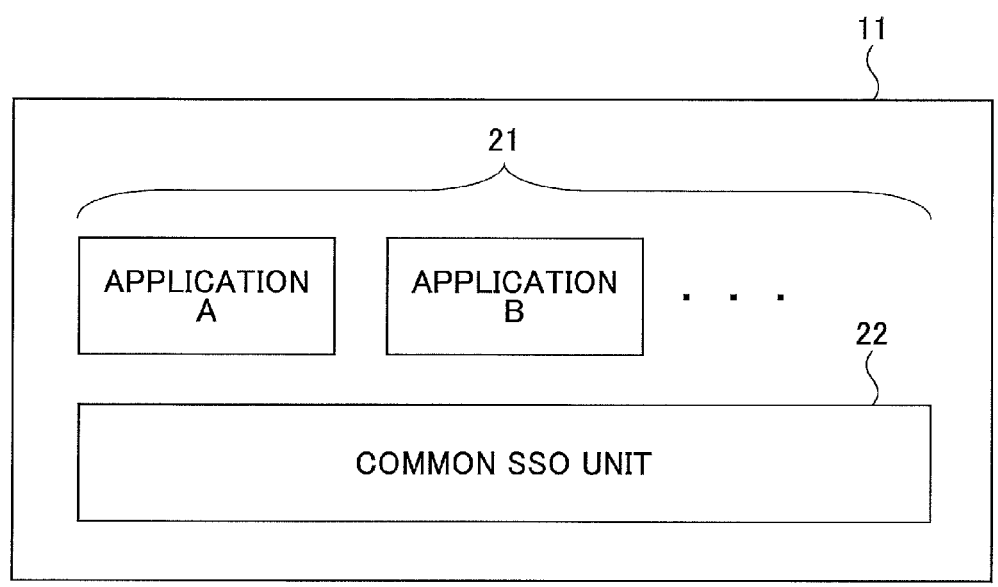
FIG. 4 illustrates processing blocks of an example of the image forming apparatus according to the first embodiment.

The image forming apparatus 11 according to the present embodiment can be realized by, for example, processing blocks as illustrated in FIG. 4. FIG. 4 illustrates processing blocks of an example of the image forming apparatus according to the present embodiment. Note that in the image forming apparatus 11 of FIG. 4, processing blocks that are unnecessary for describing the present embodiment are not illustrated.

In the image forming apparatus 11, one or more applications 21 and a common SSO (single sign on) unit 22 are operating. Note that the application 21 may use a SDK application that is an application developed by using SDK (Software Development Kit).

The application 21 performs processes in cooperation with the external service device 12. The common SSO unit 22 provides, to the application 21, a common IF (interface) for storing/acquiring authentication information of the external service device 12. The registering of authentication information of the external service device 12 in the service providing system 10, and the acquiring of authentication information of the external service device 12 from the service providing system 10, are performed by the common SSO unit 22.

The application 21 uses the authentication information of the external service device 12 that is acquired via the common SSO unit 22, to acquire an authentication ticket token needed for using the external service device 12. Then, the application 21 uses the acquired authentication ticket token to use a function of the external service device 12. The application 21 may store the setting information unique to the application, in the service providing system 10.

<<Service Providing System>>

Figure 5:
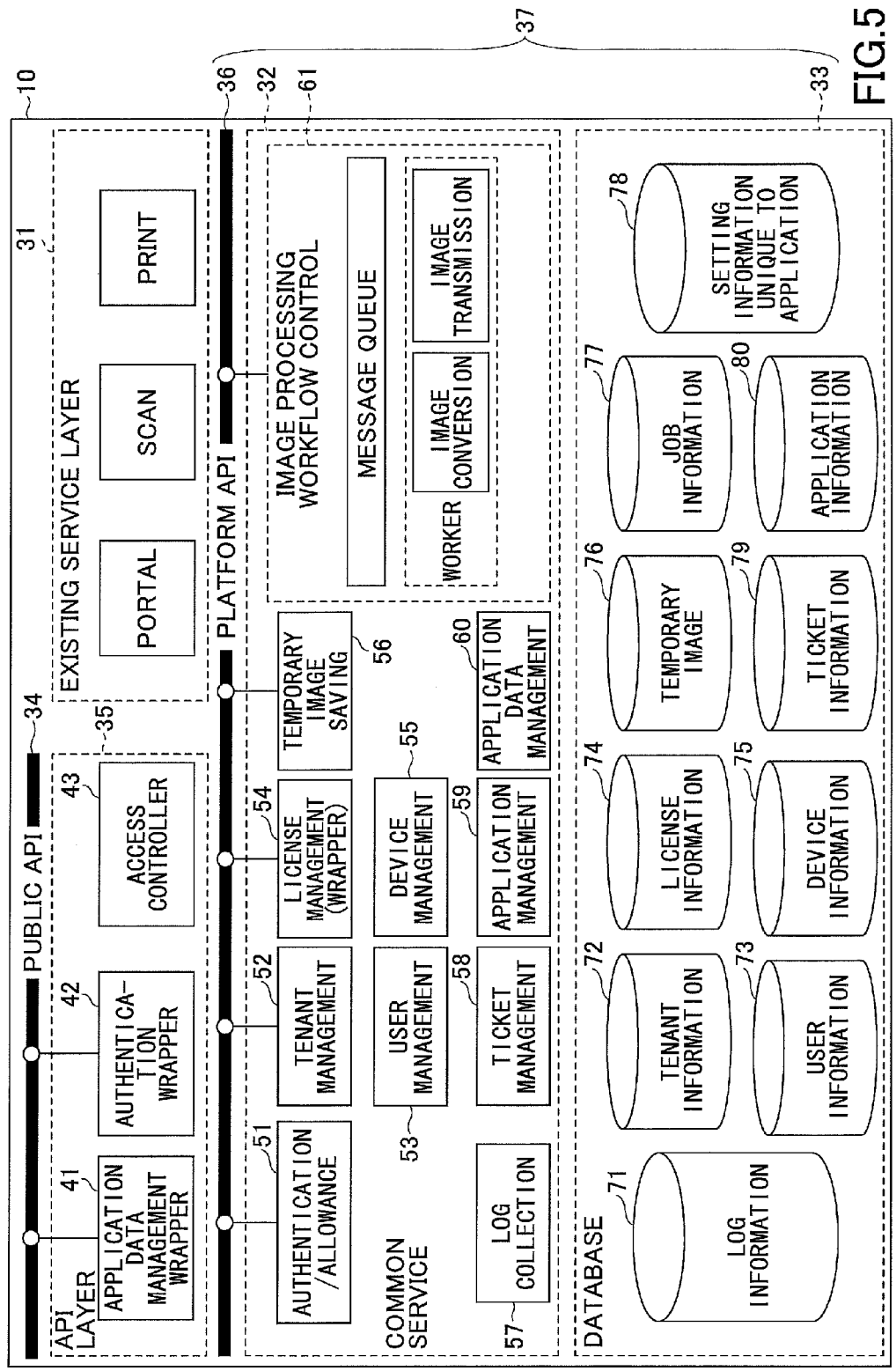
FIG. 5 illustrates processing blocks of an example of a service providing system according to the first embodiment.

The service providing system 10 according to the present embodiment is realized by, for example, processing blocks as illustrated in FIG. 5. FIG. 5 illustrates processing blocks of an example of the service providing system 10 according to the present embodiment.

The service providing system 10 illustrated in FIG. 5 realizes an existing service layer 31, a common service layer 32, a database layer 33, a public API 34, an API layer 35, and a platform API 36, by executing programs. The common service layer 32 and the database layer 33 constitute a platform layer 37.

The public API 34 is an interface for the image forming apparatus 11 to use the service providing system 10. The public API 34 is an interface defined in advance, which is provided for the API layer 35 to receive requests from the image forming apparatus 11. The public API 34 is constituted by, for example, functions and classes.

The API layer 35 has a role as a wrapper layer for providing the platform API 36 to a vendor. The API layer 35 includes an application data management wrapper 41, an authentication wrapper 42, and an access controller 43.

The application data management wrapper 41 has a role of a mini storage for managing data such as setting information unique to an application. The authentication wrapper 42 has a role of a wrapper of an authentication/allowance unit 51, a tenant management unit 52, a user management unit 53, and a ticket management unit 58, of the common service layer 32. The access controller 43 checks the validity of the image forming apparatus 11 that is a client, when using the platform API 36.

The existing service layer 31 provides existing services. The existing service layer 31 includes, for example, a portal service application, a scan service application, and a print service application. The existing service layer 31 may include other service applications.

The service applications of the existing service layer 31 provide various services by using the platform API 36. The platform API 36 is an interface for the service applications of the existing service layer 31 to use the platform layer 37.

The platform API 36 is an interface that is defined in advance, which is provided for the platform layer 37 to receive requests from the service applications of the existing service layer 31. The platform API 36 is constituted by, for example, functions and classes.

When the service providing system 10 is constituted by a plurality of information processing devices, the platform API 36 may be realized by, for example, a web API that can be used via the network.

The common service layer 32 includes an authentication/allowance unit 51, a tenant management unit 52, a user management unit 53, a license management unit 54, a device management unit 55, a temporary image saving unit 56, a log collection unit 57, a ticket management unit 58, an application management unit 59, an application data management unit 60, and an image processing workflow control unit 61. Furthermore, the image processing workflow control unit 61 includes a message queue and one or more workers. A worker realizes functions such as image conversion and image transmission.

The authentication/allowance unit 51 executes authentication/allowance based on a login request from an electronic device such as the image forming apparatus 11. The authentication/allowance unit 51 authenticates/allows a user by accessing a user information storage unit 73 and a license information storage unit 74. Furthermore, the authentication/allowance unit 51 authenticates an electronic device such as the image forming apparatus 11, by accessing a tenant information storage unit 72, the license information storage unit 74, and a device information storage unit 75.

The tenant management unit 52 manages tenant information stored in the tenant information storage unit 72. The user management unit 53 manages user information stored in the user information storage unit 73. The license management unit 54 manages license information stored in the license information storage unit 74.

The device management unit 55 manages device information stored in the device information storage unit 75. The temporary image saving unit 56 saves a temporary image in a temporary image storage unit 76, and acquires a temporary image from the temporary image storage unit 76.

The log collection unit 57 manages log information stored in a log information storage unit 71. The ticket management unit 58 has functions such as issuing an authentication ticket associated with the user, checking the validity of the authentication ticket, managing the expiration date, and managing the upper limit. The application management unit 59 manages application information stored in an application information storage unit 80. The application data management unit 60 manages setting information unique to an application stored in a setting information storage unit 78 unique to an application.

The image processing workflow control unit 61 controls a workflow relevant to image processing, based on a request. The message queue includes a queue corresponding to the type of process. The image processing workflow control unit 61 inputs a message of a request relevant to the process (job), to a queue corresponding to the type of the job.

The worker monitors a corresponding queue. When a message is input to a queue, the worker performs processes such as image conversion and image transmission according to the type of the corresponding job. The message input to the queue may be proactively read (pulled) by the worker, or may be provided (pushed) from the queue to the worker.

The database layer 33 includes a log information storage unit 71, a tenant information storage unit 72, a user information storage unit 73, a license information storage unit 74, a device information storage unit 75, a temporary image storage unit 76, a job information storage unit 77, a setting information storage unit 78 unique to the application, a ticket information storage unit 79, and an application information storage unit 80.

The log information storage unit 71 stores log information. The tenant information storage unit 72 stores tenant information. The user information storage unit 73 stores user information. The license information storage unit 74 stores license information. The device information storage unit 75 stores device information.

The temporary image storage unit 76 stores a temporary image. A temporary image is, for example, a file and data such as a scan image to be processed by the worker. The job information storage unit 77 stores information (job information) of a request relevant to a process (job). The setting information storage unit 78 unique to an application stores setting information unique to an application. The ticket information storage unit 79 stores ticket information. The application information storage unit 80 stores application information.

Note that the authentication information of the external service device 12 is stored in the setting information storage unit 78 unique to an application of the platform layer 37, via the application data management wrapper 41 of the API layer 35. In order to use the public API 34, for example, the image forming apparatus 11 needs an application ID and an application key issued by the company managing the service providing system 10. The application ID and the application key are stored in the application information storage unit 80 via the application management unit 59.

The service providing system 10 of FIG. 5 is provided with the API layer 35 and is thus able to upgrade the version of the public API 34 and to perform maintenance on the public API 34, without affecting the existing service layer 31. Furthermore, the service providing system 10 of FIG. 5 is able to limit the API to be open to the public by the public API 34, without providing the entire platform API 36 to the vendor.

The service providing system 10 functions as an integration base for providing a common service and a database as a platform, and as a service group for providing application services by using the functions of the integration base. The integration base is constituted by, for example, the common service layer 32, the database layer 33, and the platform API 36. The service group is constituted by, for example, the public API 34, the API layer 35, and the existing service layer 31.

The service providing system 10 illustrated in FIG. 5 is able to easily develop the service applications using the platform API 36, by a configuration in which the service group and the integration base are separated.

Note that the classification mode of the process blocks of the service providing system 10 of FIG. 5 is one example; it is not essential that the process blocks are classified by the hierarchy as illustrated in FIG. 5. As long as processes of the service providing system 10 according to the present embodiment may be performed, the hierarchal relationships, etc., illustrated in FIG. 5 are not particularly limited.

<Details of Process>

<<Service Registration Process>>

Figure 6:
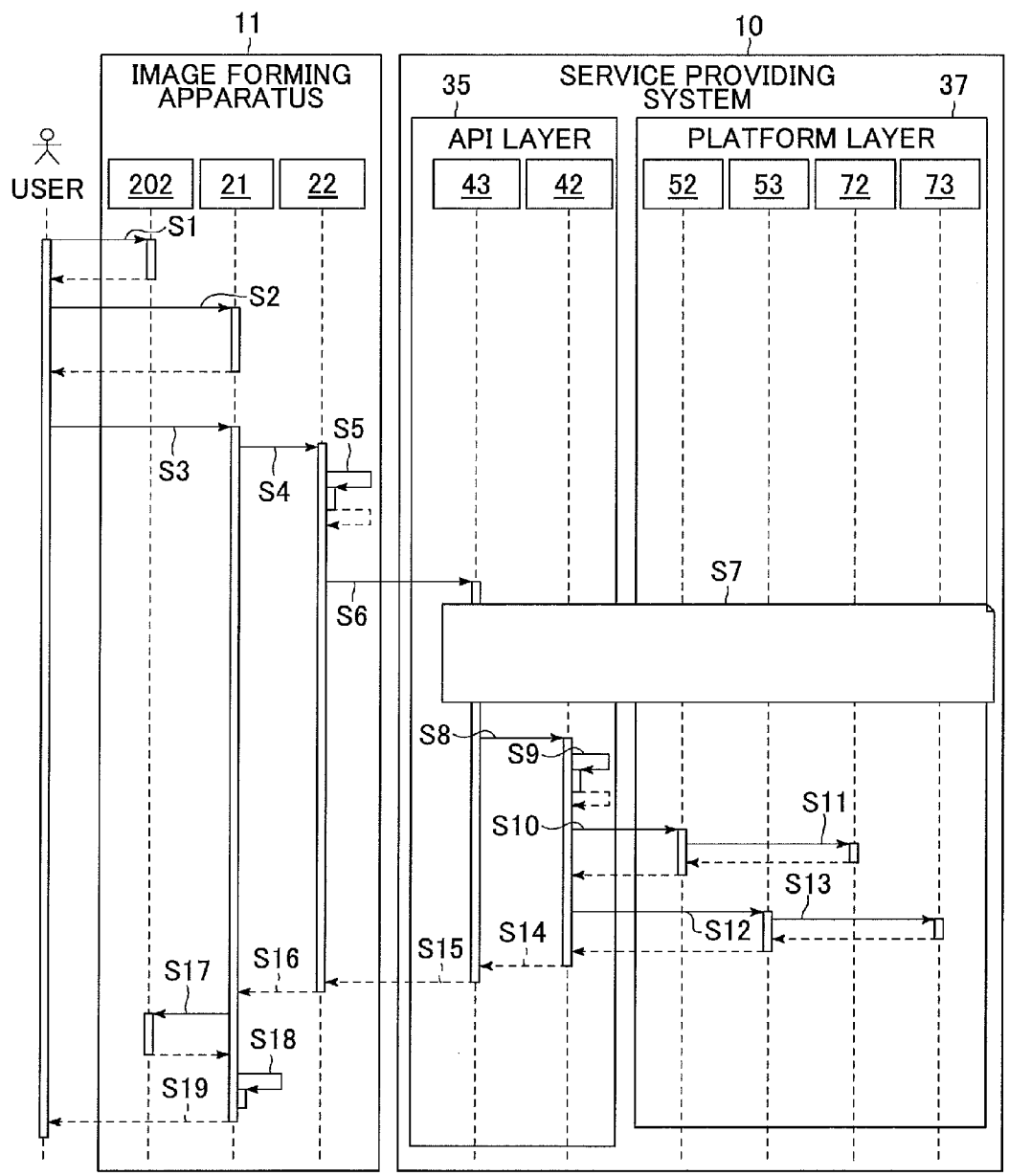
FIG. 6 is a sequence diagram of an example of a service registration process.

The application 21 that operates in the image forming apparatus 11 needs to perform service registration as illustrated in FIG. 6, as a precondition for storing authentication information of the external service device 12 by using the public API 34 of the service providing system 10.

FIG. 6 is a sequence diagram of an example of a service registration process. In step S1, the user inputs, in the operation panel 202, an MFP user ID and an MFP password for using the image forming apparatus 11, and logs into the image forming apparatus 11. When the login is successful, the image forming apparatus 11 displays a top screen on the operation panel 202.

In step S2, the user activates the application 21 that the user wants to use, from the top screen. When the service registration has not been done, the activated application 21 displays a service registration screen on the operation panel 202.

In step S3, the user inputs a password in the service registration screen, and requests service registration. Note that in step S3, the input password is the password for tenant authentication described below, and this password is determined by the user.

In step S4, the application 21 requests the common SSO unit 22 to perform service registration according to the password input by the user. In step S5, the common SSO unit 22 acquires an application ID and an application key stored in itself.

In step S6, the common SSO unit 22 uses the password, the application ID, and the application key to request the service providing system 10 to perform service registration. In step S7, the service providing system 10, which has received the request for service registration, performs application authentication, and confirms the validity of the common SSO unit 22 that is the client. Note that details of the application authentication of step S7 are described below. Here, the description is continued assuming that the validity of the common SSO unit 22 has been confirmed.

In step S8, the access controller 43 of the service providing system 10 requests the authentication wrapper 42 to perform service registration. In step S9, the authentication wrapper 42 applies a serial number as the tenant ID, to be registered in the service providing system 10.

In step S10, the authentication wrapper 42 requests the tenant management unit 52 to create a tenant according to the applied tenant ID. In step S11, the tenant management unit 52 performs tenant registration by registering a tenant ID in a tenant information table as illustrated in FIG. 7, which is stored in the tenant information storage unit 72. FIG. 7 illustrates an example of a tenant information table. The tenant information table is for managing tenants registered in the service providing system 10.

In step S12, the authentication wrapper 42 requests the user management unit 53 to create a tenant user for registered tenant. The request for creating a tenant user in step S12 is made by using a tenant ID and a password. In step S13, the user management unit 53 registers the user for the tenant, by registering the tenant ID, the user ID, and the password in a user information table as illustrated in FIG. 8, which is stored in the user information storage unit 73.

Note that the password registered in the user information table is the password input by the user in step S3. Furthermore, the user ID registered in the user information table is the user ID of the tenant user. The tenant user is a user who is registered based on a certain rule. For example, the user ID of the tenant user may be the same as the tenant ID.

FIG. 8 illustrates an example of a user information table. The user information table is for managing users registered in the service providing system 10. When registering a service, the user information of the tenant user is registered in the user information table.

In step S14, the authentication wrapper 42 returns a tenant ID to the access controller 43, as a response to the request for service registration in step S8. Furthermore, in step S15, the access controller 43 returns the tenant ID to the common SSO unit 22 of the image forming apparatus 11. In step S16, the common SSO unit 22 returns, to the application 21, the tenant ID received from the service providing system 10.

In step S17, the application 21 acquires an MFP user ID of the user who has logged in from the operation panel 202. In step S18, the application 21 records the MFP user ID, the tenant ID, and the password as tenant authentication information, in a tenant authentication table as illustrated in FIG. 9. FIG. 9 illustrates an example of a tenant authentication table. The tenant authentication table of FIG. 9 is used by the application 21 for storing a tenant ID and a password in association with an MFP user ID, after the service registration in the service providing system 10. In step S19, the application 21 displays the tenant ID on, for example, the operation panel 202, and reports the tenant ID to the user.

Figure 10:
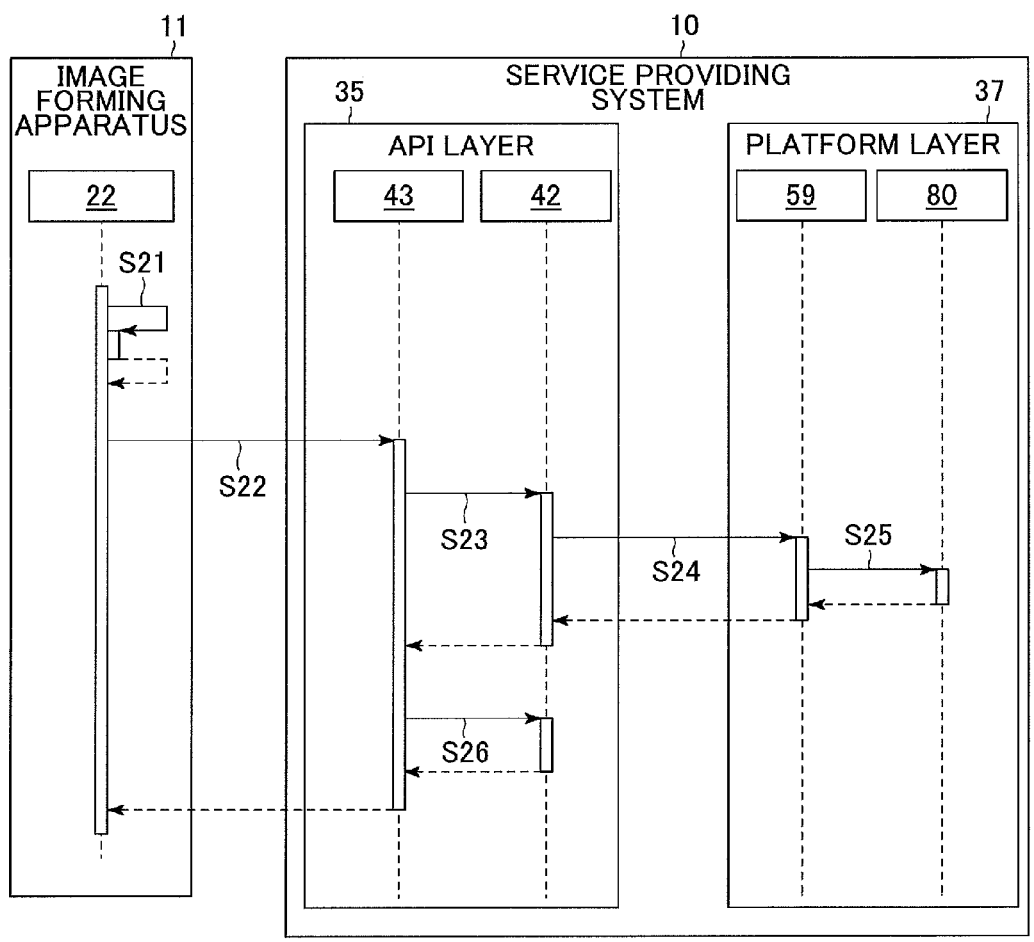
FIG. 10 is a sequence diagram of an example of an application authentication process.

The application authentication of step S7 is performed, for example, as illustrated in FIG. 10. FIG. 10 is a sequence diagram of an example of an application authentication process. When the image forming apparatus 11 uses the public API 34 of the service providing system 10, there is a need to pass the application authentication. The common SSO unit 22 that is the client, is able to use the public API 34 of the service providing system 10 by using the pair of the application ID and the application key stored in itself. Note that the pair of the application ID and the application key stored in the common SSO unit 22 itself is, for example, the application ID and the application key issued by the company managing the service providing system 10.

In step S21, the common SSO unit 22 acquires the application ID and the application key stored in itself. In step S22, the common SSO unit 22 requests the usage of the public API 34 to the service providing system 10, by using the password input in step S3 of FIG. 6, and the application ID and the application key acquired in step S21.

In step S23, the access controller 43, which has received the request to use the public API 34 from the image forming apparatus 11, requests the authentication wrapper 42 to perform application authentication by the application ID and the application key. In step S24, the authentication wrapper 42 requests the application management unit 59 to perform application authentication by the application ID and the application key.

In step S25, the application management unit 59 performs matching of the pair of the application ID and the application key included in the request for application authentication in step S24, and the pair of the application ID and the application key recorded in an application information table as illustrated in FIG. 11. FIG. 11 illustrates an example of an application information table.

The application information table stores, as application information, the pair of the application ID and the application key stored by the common SSO unit 22 that can use the public API 34. The service providing system 10 checks whether usage is possible by the application ID and the application key when using the public API 34, and allows the common SSO unit 22, which has passed the usage possibility check, to use the public API 34. The adding of the pair of the application ID and the application key to the application information table of FIG. 11 is performed by, for example, a company managing the service providing system 10.

The application management unit 59 determines that the common SSO unit 22 is valid (application authentication is successful), when the pair of the application ID and the application key, which is included in the request for application authentication, is recorded in the application information table. Furthermore, the application management unit 59 determines that the common SSO unit 22 is invalid (application authentication is unsuccessful), when the pair of the application ID and the application key, which is included in the request for application authentication, is not recorded in the application information table.

To the access controller 43, OK indicating that the application authentication is successful, or NG indicating that application authentication is unsuccessful, is returned. When the application authentication is successful, in step S26, the access controller 43 makes a request to the process block of the API layer 35 that responded to the original request.

Note that in the case of the application authentication process of step S7 in FIG. 6, the access controller 43 requests the authentication wrapper 42 to perform service registration. When the application authentication is unsuccessful, the access controller 43 does not make a request to the process block of the API layer 35 that responded to the original request, but reports to the common SSO unit 22 that the application authentication is unsuccessful.

By making the application authentication process of FIG. 10 essential, the service providing system 10 is able to protect the resources from being accessed by an unauthorized client.

Figure 12:
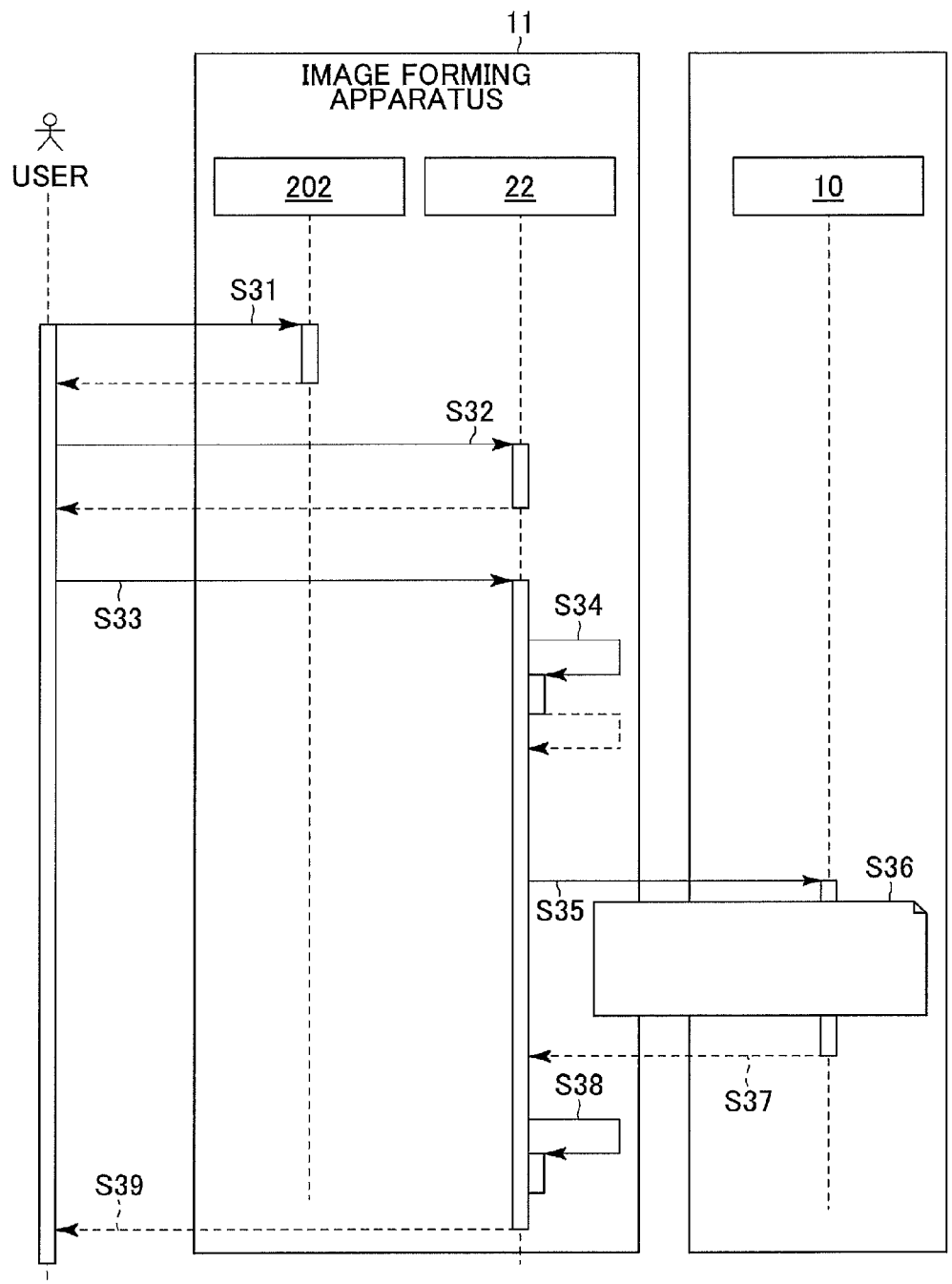
FIG. 12 is a sequence diagram of another example of the service registration process.

The service registration process may also be realized by the procedures as illustrated in FIG. 12. FIG. 12 is a sequence diagram of another example of the service registration process. In the service registration process of FIG. 6, service registration processes are performed from the respective applications 21. In the service registration process of FIG. 12, the service registration processes are not performed from the respective applications 21; the service registration process is performed from the common SSO unit 22. In FIG. 12, the respective applications 21 use the tenant authentication information recorded by the common SSO unit 22. Once the common SSO unit 22 records the tenant authentication information, the tenant authentication information may be used from all of the applications 21.

In step S31, the user inputs, in the operation panel 202, an MFP user ID and an MFP password for using the image forming apparatus 11, and logs into the image forming apparatus 11. When the login is successful, the image forming apparatus 11 displays a top screen on the operation panel 202.

In step S32, the user opens the service registration screen from the top screen, and displays the service registration screen on the operation panel 202. In step S33, the user inputs a password in the service registration screen, and requests the common SSO unit 22 to perform service registration.

In step S34, the common SSO unit 22 acquires the application ID and the application key stored in itself. In step S35, the common SSO unit 22 requests the service providing system 10 to perform service registration, by using the password, the application ID, and the application key.

Figure 13:
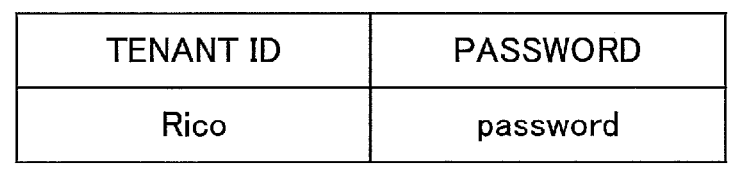

In step S36, the service providing system 10 performs the service registration process as indicated in steps S7 through S14 of FIG. 6. In step S37, the service providing system 10 returns a tenant ID to the common SSO unit 22 of the image forming apparatus 11. In step S38, the common SSO unit 22 records the tenant ID received from the service providing system 10, as tenant authentication information, in a tenant information table as illustrated in FIG. 13. FIG. 13 illustrates an example of a tenant authentication table. The tenant authentication table of FIG. 13 is used by the common SSO unit 22 for storing the tenant ID and the password in association with each other, after the service registration in the service providing system 10. In step S39, the common SSO unit 22 displays the tenant ID on, for example, the operation panel 202, and reports the tenant ID to the user.

<<Data Registration Process>>

Figure 14:
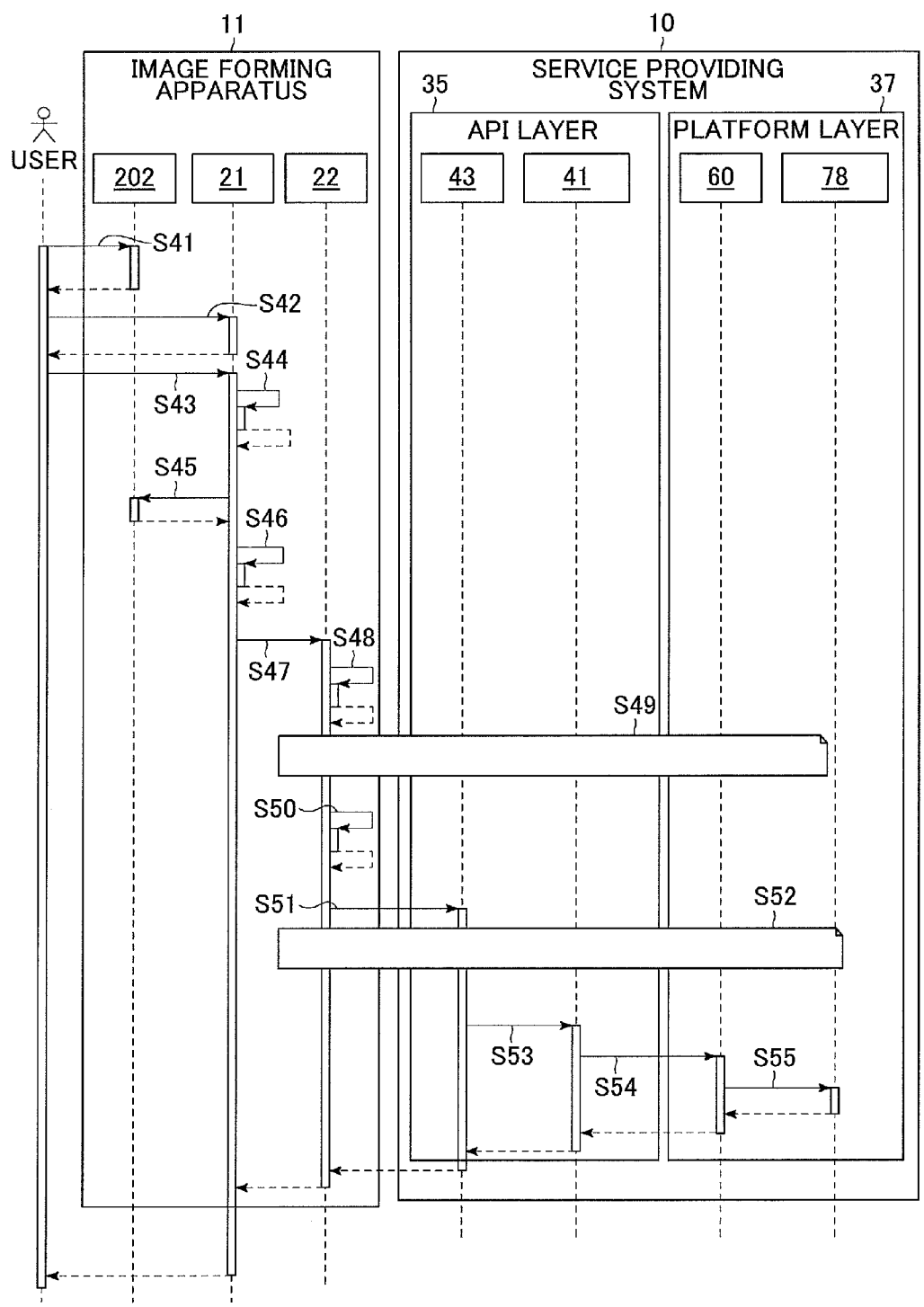
FIG. 14 is a sequence diagram of an example of a data registration process.

The application 21 operating in the image forming apparatus 11 needs to perform data registration as illustrated in FIG. 14, in order to store the authentication information of the external service device 12 by using the public API 34 of the service providing system 10.

FIG. 14 is a sequence diagram of an example of a data registration process. The sequence diagram of FIG. 14 illustrates a process in a case where the application 21 holds tenant authentication information. In step S41, the user inputs, in the operation panel 202, an MFP user ID and an MFP password for using the image forming apparatus 11, and logs into the image forming apparatus 11. When the login is successful, the image forming apparatus 11 displays a top screen on the operation panel 202. In step S42, the user activates the application 21 that the user wants to use, from the top screen. The activated application 21 displays a top screen on the operation panel 202.

In step S43, the user inputs, in the top screen, the user ID of an external service and the password of the external service, as authentication information of the external service device 12, and requests to register external service information.

In step S44, the application 21 acquires an encoding key held in itself. Note that the encoding key held by the application 21 differs according to the application 21. Therefore, if the application 21 erroneously acquires the authentication information encoded by another application 21, the information cannot be decoded.

In step S45, the application 21 acquires the MFP user ID of the user who has logged in from the operation panel 202. In step S46, the application 21 acquires, from the tenant authentication table as illustrated in FIG. 9, the tenant ID and password associated with the MFP user ID.

In step S47, the application 21 requests the common SSO unit 22 to perform data registration, by using the user ID of the external service and the password of the external service input by the user, and the acquired encoding key, tenant ID, and password.

In step S48, the common SSO unit 22 acquires the application ID and the application key stored in itself. Furthermore, in step S49, the common SSO unit 22 performs tenant authentication, and acquires an authentication of the service providing system 10. Note that details of the tenant authentication of step S49 are described below. Here, the description is continued assuming that the authentication ticket of the service providing system 10 has been acquired.

In step S50, the common SSO unit 22 encodes, by the encoding key received from the application 21, the user ID of the external service and the password of the external service as authentication information of the external service device 12, and acquires an encoded user ID and encoded password. In step S51, the common SSO unit 22 requests the service providing system 10 to perform data registration, by using the encoded user ID, the encoded password, the MFP user ID, the external service identifier, the application ID, the application key, and the authentication ticket.

In step S52, the service providing system 10 checks the validity of the authentication ticket. Note that details of the validity check of the authentication ticket of step S52 are described below. Here, the description is continued assuming that the authentication ticket is valid as a result of the validity check of the authentication ticket.

Because the authentication ticket is valid, the access controller 43 requests the application data management wrapper 41 to perform data registration, by using the encoded user ID, the encoded password, the application ID, the MFP user ID, the tenant ID, and the external service identifier.

In step S54, the application data management wrapper 41 requests the application data management unit 60 to perform data registration, by using the encoded user ID, the encoded password, the application ID, the MFP user ID, the tenant ID and the external service identifier. In step S55, the application data management unit 60 registers data in a setting information table unique to the application as illustrated in FIG. 15, which is stored in the setting information storage unit 78 unique to the application. FIG. 15 illustrates an example of a setting information table unique to the application.

It is assumed that the setting information table unique to the application is also used in cases other than cooperating with the external service device 12, and therefore the table has a general table configuration. The data stored in the setting information table unique to the application differs according to the application 21 operating on the image forming apparatus 11.

The setting information table unique to the application illustrated in FIG. 15 includes, as items, an application ID, a tenant ID, a Key1, a Key2, a Key3, and a Value. When cooperating with the external service device 12, the items of the setting information table unique to the application are used as follows. Note that in FIG. 15, the top two records are examples of cases of cooperating with the external service device 12.

The application ID is an application ID stored in the common SSO unit 22 itself. The tenant ID is a tenant ID applied by the service providing system 10. The Key1 is the MFP user ID. The Key2 is the external service identifier. The Key3 is a column for storing the data type to be stored. The Value is the actual data to be stored.

For example, in FIG. 15, "User_id" is stored as the data type expressing the encoded user ID, in the first Key3 from the top. In FIG. 15, "password" is stored as the data type expressing the encoded password, in the second Key3 from the top.

The setting information table unique to the application of FIG. 15 is constituted by multiple tenants, and therefore in order to acquire information from the setting information storage unit 78 unique to the application, the tenant authentication of step S49 needs to be passed.

Note that when the common SSO unit 22 holds the tenant authentication information, the processes of steps S45 and S46 of FIG. 14 are not performed. The common SSO unit 22 acquires the MFP user ID of the user who has logged in from the operation panel 202, after receiving the request for data registration from the application 21 in step S47.

Figure 16:
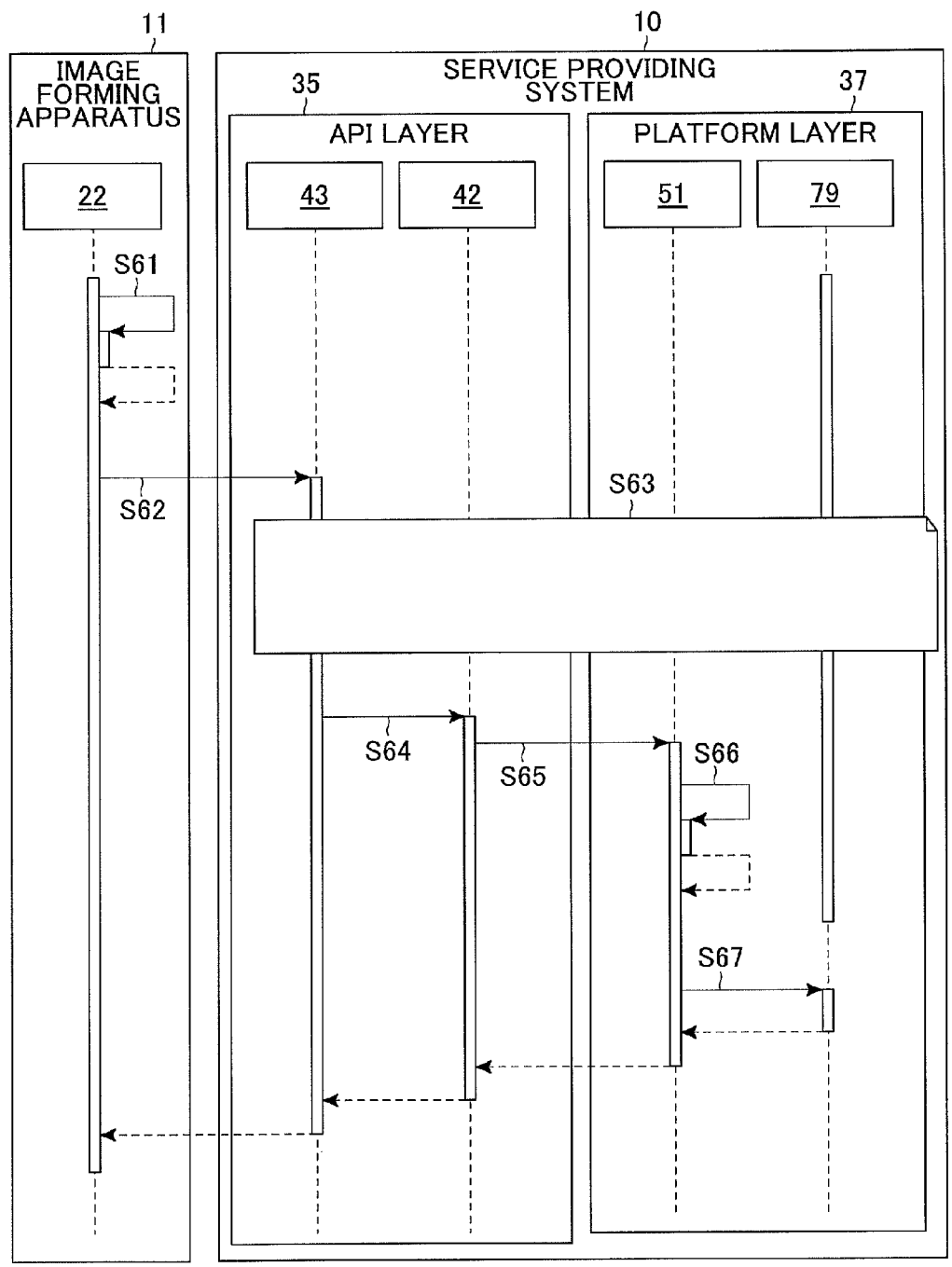
FIG. 16 is a sequence diagram of an example of a tenant authentication process.

The tenant authentication of step S49 is performed, for example, as illustrated in FIG. 16. FIG. 16 is a sequence diagram of an example of a tenant authentication process. In step S61, the common SSO unit 22 acquires the application ID and the application key stored in itself. In step S62, the common SSO unit 22 requests to log into the service providing system 10 by using the tenant ID, the password, the application ID, and the application key.

At the service providing system 10 that has received the request to log in, first, application authentication is performed in step S63. Application authentication is the process illustrated in FIG. 10. Here, the description is continued assuming that the validity of the common SSO unit 22 has been confirmed (passed application authentication).

In step S64, the access controller 43 makes a login request to the authentication wrapper 42, by using the tenant ID and the password. In step S65, the authentication wrapper 42 makes a login request to the authentication/allowance unit 51 by using the tenant ID and the password. Here, the description is continued assuming that the login is successful.

In step S66, the authentication/allowance unit 51 issues an authentication ticket. In step S67, the authentication/allowance unit 51 stores the issued authentication ticket in association with the tenant ID and the user ID, in the authentication ticket table as illustrated in FIG. 17, which is stored in the ticket information storage unit 79. FIG. 17 illustrates an example of an authentication ticket table. The authentication ticket table is for managing authentication tickets issued by the service providing system 10. In order to access the resources of the service providing system 10 protected by a tenant, an authentication ticket issued by tenant authentication of FIG. 16 is needed.

Figure 18:
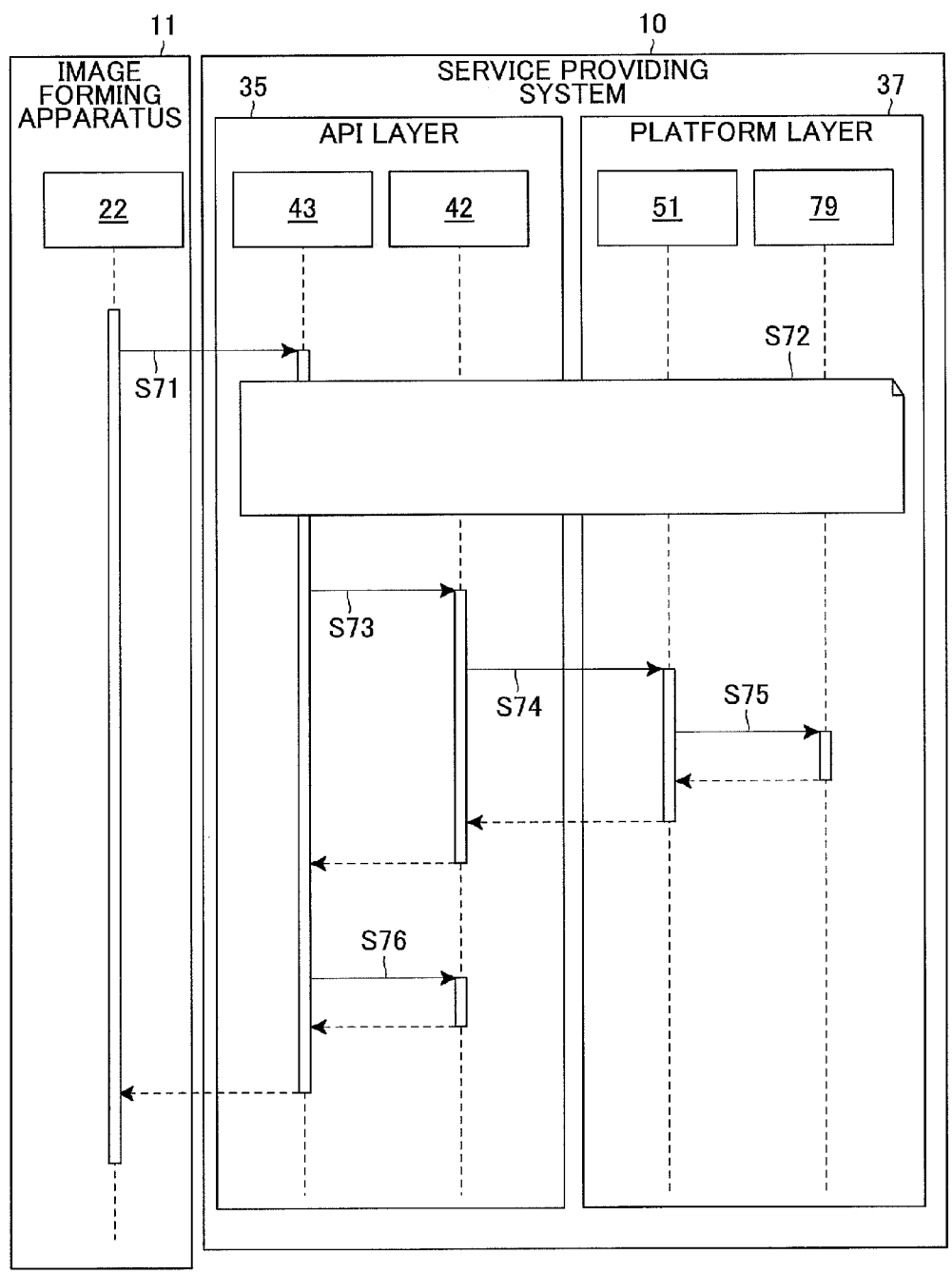
FIG. 18 is a sequence diagram of a process of checking the validity of an authentication ticket.

Furthermore, the validity check of the authentication ticket of step S52 is performed, for example, as illustrated in FIG. 18. FIG. 18 is a sequence diagram of a process of checking the validity of an authentication ticket. When using the resources of the service providing system 10 protected by the authentication ticket, the image forming apparatus 11 needs to pass the validity check of an authentication ticket.

In step S71, the common SSO unit 22 requests to use the public API 34 to the service providing system 10, by using the password input in step S3 of FIG. 6, and the application ID and the application key acquired in step S48. The validity check of the authentication ticket is performed when the request is made to use the public API 34.

The service providing system 10 that has received the request to use the public API 34 performs application authentication in step S63. The application authentication is the process illustrated in FIG. 10. Here, the description is continued assuming that the validity of the common SSO unit 22 has been confirmed (passed the application authentication).

In step S73, the access controller 43 requests the authentication/allowance unit 51 to perform the validity check of the authentication ticket. In step S75, the authentication/allowance unit 51 performs matching of the authentication ticket included in the request for the validity check in step S74, and the authentication ticket recorded in the authentication ticket table as illustrated in FIG. 17. When the authentication ticket included in the request for the validity check is recorded in the authentication ticket table, the authentication/allowance unit 51 determines that the authentication ticket is valid. When the authentication ticket is valid, in step S76, the access controller 43 makes a request to the process block of the API layer 35 that responded to the original request.

<<Service Registration Process by Second Image Forming Apparatus and Onward>>

Figure 19:
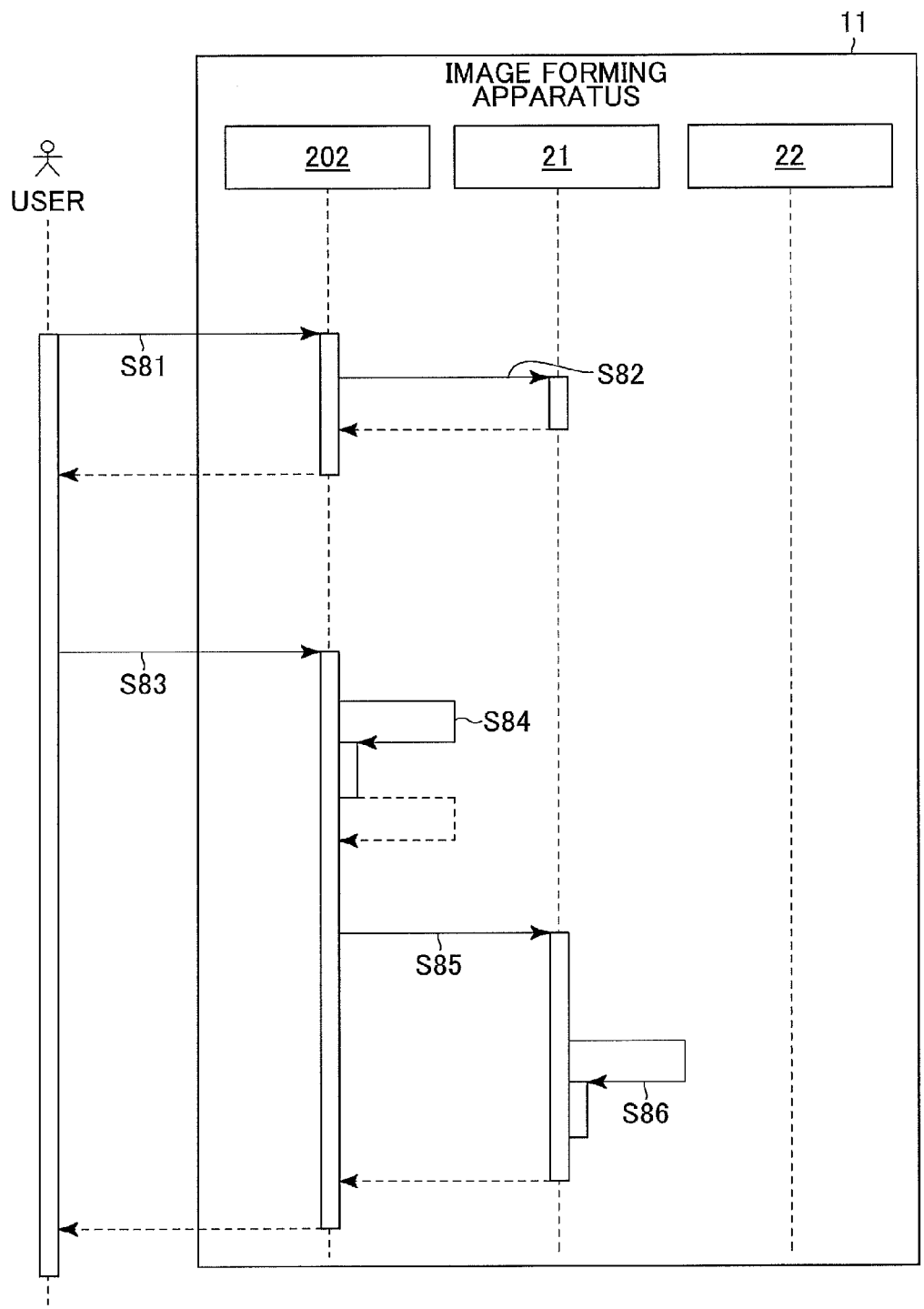
FIG. 19 is a sequence diagram of an example of a service registration process performed by the second image forming apparatus and onward.

The service registration process performed by the second image forming apparatus 11 and onward is performed by, for example, the procedures as illustrated in FIG. 19. FIG. 19 is a sequence diagram of an example of a service registration process performed by the second image forming apparatus and onward.

In step S81, the user inputs, in the operation panel 202, an MFP user ID and an MFP password for using the image forming apparatus 11, and logs into the image forming apparatus 11.

When the login is successful, in step S82, the image forming apparatus 11 activates the application 21, and displays a top screen on the operation panel 202. In step S83, the user inputs a tenant ID and a password in the top screen, and requests service registration. The top screen may be provided with a mechanism that prompts the user to select a service registration process by the first image forming apparatus 11 or a service registration process by the second image forming apparatus 11 and onward.

In step S84, the operation panel 202 acquires the MFP user ID of the user who has logged in. In step S85, the operation panel 202 requests the application 21 to perform service registration by using the tenant ID and the password. In step S86, the application 21 records the MFP user ID, the tenant ID, and the password, as tenant authentication information, in the tenant authentication table illustrated in FIG. 9.

As described above, in the service registration process performed by the second image forming apparatus 11 and onward illustrated in FIG. 19, the tenant ID issued by the service providing system 10 in the service registration process performed by the first image forming apparatus 11, is recorded as the tenant authentication information. Therefore, the second image forming apparatus 11 and onward is able to perform authentication with respect to the service providing system 10, by the same tenant ID as that of the first image forming apparatus 11. In the information processing system 1 according to the present embodiment, once the authentication information of the external service device 12 is registered in the service providing system 10, the authentication information of the external service device 12 can be used by the applications 21 of a plurality of image forming apparatuses 11.

<<External Service Usage Process>>

Figure 20:
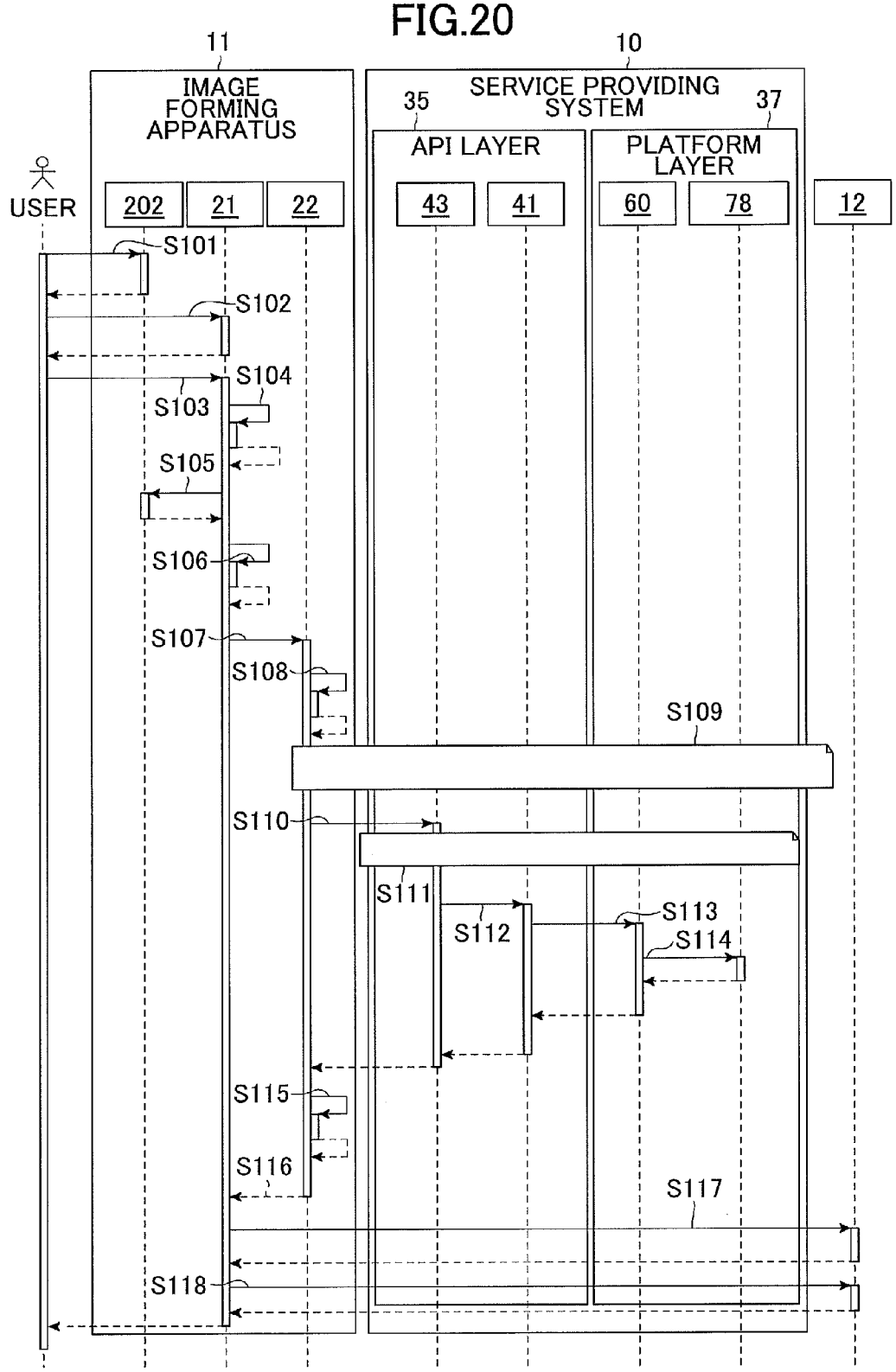
FIG. 20 is a sequence diagram of an example of an external service usage process.

FIG. 20 is a sequence diagram of an example of an external service usage process. In step S101, the user inputs, in the operation panel 202, an MFP user ID and an MFP password for using the image forming apparatus 11, and logs into the image forming apparatus 11. When the login is successful, the image forming apparatus 11 displays a top screen on the operation panel 202.

In step S102, the user activates the application 21 that the user wants to use, from the top screen. In step S103, the user requests to use an external service from the operation panel 202.

In step S104, the application 21 acquires an encoding key held in itself. In step S105, the application 21 acquires the MFP user ID of the user who has logged in from the operation panel 202. Furthermore, in step S106, the application 21 acquires a tenant ID and password associated with the MFP user ID, from the tenant authentication table as illustrated in FIG. 9.

In step S107, the application 21 requests the common SSO unit 22 to acquire data, by using the MFP user ID of the user who has logged in from the operation panel 202, and the acquired encoded key, tenant ID, and password.

In step S108, the common SSO unit 22 acquires the application ID and the application key stored in itself. Furthermore, in step S109, the common SSO unit 22 performs tenant authentication, and acquires the authentication ticket of the service providing system 10. Here, the description is continued assuming that the authentication ticket of the service providing system 10 has been acquired.

In step S110, the common SSO unit 22 requests the service providing system 10 to acquire data, by using the MFP user ID, the external service identifier, the application ID, the application key, and the authentication ticket.

In step S111, the service providing system 10 performs a validity check of the authentication ticket illustrated in FIG. 18. Here, the description is continued assuming that the authentication ticket is valid as a result of the validity check of the authentication ticket. Because the authentication ticket is valid, the access controller 43 requests the application data management wrapper 41 to acquire data, by using the application ID, the MFP user ID, and the tenant ID.

In step S113, the application data management wrapper 41 requests the application data management unit 60 to acquire data, by using the application ID, the MFP user ID, and the tenant ID. In step S114, the application data management unit 60 acquires data from the setting information table unique to the application illustrated in FIG. 15, which is stored in the setting information storage unit 78 unique to the application. The application data management unit 60 acquires the encoded user ID and the encoded password from the setting information table unique to the application illustrated in FIG. 15.

The encoded user ID and the encoded password acquired from the setting information table unique to the application are returned to the common SSO unit 22 of the image forming apparatus 11. In step S115, the common SSO unit 22 decodes the encoded user ID and the encoded password, with the encoding key received from the application 21, and acquires the user ID of the external service and the password of the external service as the authentication information of the external service device 12.

In step S116, the common SSO unit 22 returns, to the application 21, the user ID of the external service and the password of the external service as the authentication information of the external service device 12, which are acquired by the decoding process performed in step S115. As described above, the application 21 is able to acquire the user ID of the external service and the password of the external service, as authentication information of the external service device 12.

In step S117, the application 21 logs into the external service device 12 by using the user ID of the external service and the password of the external service, as authentication information of the external service device 12. When the login is successful, the application 21 acquires a ticket (external service ticket) issued by the external service device 12. In step S118, the application 21 becomes capable of using a function provided by the external service device 12, by using the external service ticket.

Figures 21, 22:
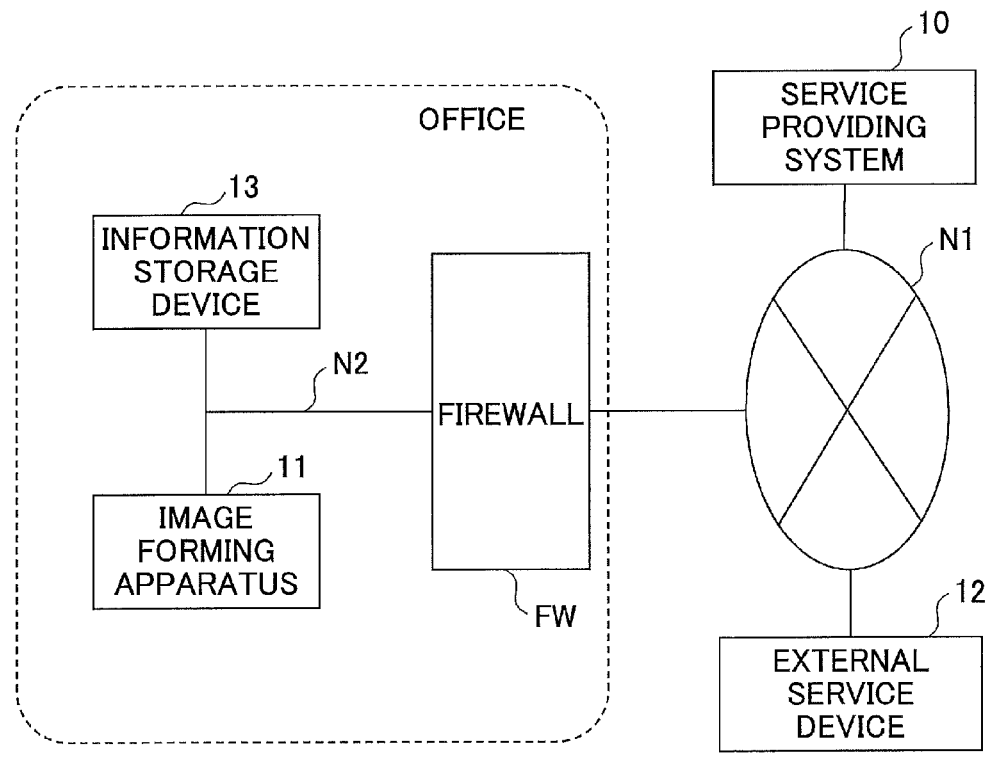
FIG. 21 illustrates an example of authentication information of an external service device.
FIG. 22 illustrates a configuration of an example of an information processing system according to a second embodiment.

According to the external service usage process of FIG. 20, the application 21 is able to acquire the authentication information of the external service device 12 stored in the service providing system 10 via the common SSO unit 22. The authentication information of the external service device 12 acquired from the service providing system 10 is, for example, as illustrated in FIG. 21. FIG. 21 illustrates an example of authentication information of the external service device 12. Therefore, the application 21 is able to use a function of the external service device 12 by using the authentication information of the external service device 12 acquired from the service providing system 10.

Second Embodiment

In the first embodiment, the authentication information of the external service device 12 is stored in the service providing system 10. In a second embodiment, the authentication information of the external service device 12 may be stored in an information storage device 13 provided in the same intranet, etc., as that of the image forming apparatus 11.

FIG. 22 illustrates a configuration of an example of an information processing system according to a second embodiment. In an information processing system 2 of FIG. 22, the information storage device 13 and a firewall FW are added, to the configuration of the information processing system 1 illustrated in FIG. 1. In the information processing system 2 of FIG. 22, a network N1 and a network N2 are connected via the firewall FW. To the network N2, the image forming apparatus 11 and the information storage device 13 are connected. In the information processing system 2 of FIG. 22, the authentication information of the external service device 12 may be stored in the information storage device 13 that is provided in the same network N2 as that of the image forming apparatus 11.

In the case of the information processing system 2, immediately after step S47 of the data registration process of FIG. 14, it is determined whether to use the service providing system 10 or the information storage device 13, as the data registration destination. When it is determined to use the information storage device 13 as the data registration destination, the common SSO unit 22 skips from step S47 to step S51, and requests the information storage device 13 to perform data registration in step S51.

Furthermore, in the case of the information processing system 2, immediately after step S107 of the external service usage process of FIG. 20, it is determined whether to use the service providing system 10 or the information storage device 13, as the data acquisition destination. When it is determined to use the information storage device 13 as the data acquisition destination, the common SSO unit 22 skips from step S107 to step S110, and requests the information storage device 13 to perform data acquisition in step S110.

Furthermore, in the information processing system 1 according to the present embodiment, the public API 34 of the service providing system 10 is used from the common SSO unit 22; however, the service providing system 10 may be used from the application 21. In this case, an application ID and an application key are issued for each application 21. The application 21 is able to use the service providing system 10 by using the application ID and the application key that have been issued for each application 21.

In the information processing system 1 according to the present embodiment, the service providing system 10 may also be used from an application operating in the external service device 12 or a terminal device such as a smartphone or a PC, other than the application 21 operating in the image forming apparatus 11.

(Overview)

According to the information processing system 1, 2 according to the present embodiment, it is easy to develop and operate the application 21, which operates in an electronic device such as the image forming apparatus 11, and which performs processes in cooperation with the external service device 12.

For example, in the information processing system 1, 2 according to the present embodiment, by transferring the function of storing the authentication information of the external service device 12 from the external service device 12 to the service providing system 10, it is possible to reduce the development processes of the application 21.

Furthermore, once the application 21 operating in the image forming apparatus 11 registers the authentication information of the external service device 12 in the service providing system 10, a plurality of the image forming apparatuses 11 are able to share the authentication information of the external service device 12. Furthermore, in the information processing system 1, 2 according to the present embodiment, the authentication information of the external service device 12 can be held, without depending on resource restrictions of the image forming apparatus 11. By providing the common SSO unit 22 in the image forming apparatus 11, it is possible to easily develop the application 21 operating in the image forming apparatus 11 by using the common SSO unit 22.

The information processing system and the authentication information providing method are not limited to the specific embodiments described herein, and variations and modifications may be made without departing from the spirit and scope of the present invention.

Note that the common SSO unit 22 is an example of a requesting unit. The access controller 43 is an example of an access control unit. The application data management wrapper 41 and the application data management unit 60 are examples of a data management unit. The application ID and the application key are examples of identification information of the requesting unit. The API layer 35 is an example of a public interface layer. The platform API 36 is an example of a non-public interface. The application data management unit 60 is an example of a data acquiring unit. The application data management wrapper 41 is an example of a non-public interface hiding unit. The authentication wrapper 42 and the authentication/allowance unit 51 are examples of an authentication unit. The tenant ID is an example of identification information of a group for grouping users of the electronic device.

According to one embodiment of the present invention, an information processing system and an authentication information providing method are provided, which are capable of easily developing an application that performs a process in cooperation with an external service.

The present application is based on and claims the benefit of priority of Japanese Priority Patent Application No. 2014-047969, filed on Mar. 11, 2014, the entire contents of which are hereby incorporated herein by reference.

What is claimed is:

1. An information processing system comprising:
an image forming device;
a service providing system including one or more information processing devices that are connected to the image forming device via a network;
a single sign on unit configured to send a request from the image forming device to the service providing system, to acquire authentication information of a plurality of external services provided by a plurality of external service devices that are connected to the image forming device through the network in cooperation with an application operating in the image forming device;
an access control unit configured to receive the request from the single sign on unit whose validity has been confirmed, based on a result of confirming the validity of the requesting unit obtained by using identification information of the single sign on unit, in the service providing system; and
a data management unit configured to acquire the authentication information of the external service from a storage unit based on the request from the single sign on unit whose validity has been confirmed, said storage unit being configured to have a setting information table including the authentication information of the plurality of external services, and to provide the authentication information of the plurality of external services to the single sign on unit via the access control unit.

2. The information processing system according to claim 1, wherein
the service providing system includes
an application programming interface layer configured to receive the request from the image forming device via the network, and
a platform layer configured to perform a process based on the request received by the application programming interface layer, wherein
the data management unit includes, in the platform layer, a data acquiring unit configured to acquire the authentication information of the external service from the storage unit, based on the request from the single sign on unit whose validity has been confirmed, and the data management unit includes, in the application programming interface layer, a platform application programming interface hiding unit configured to cause the data acquiring unit to process the request from the single sign on unit, by using the platform application programming interface for receiving the request to the data acquiring unit in the platform layer.

3. The information processing system according to claim 2, wherein
the service providing system includes an authentication unit configured to confirm the validity of the single sign on unit by using the identification information of the single sign on unit, based on whether a storage unit in the platform layer includes the identification information of the single sign on unit.

4. The information processing system according to claim 1, wherein
the data management unit registers the authentication information of the external service in the storage unit in association with the identification information of the single sign on unit, based on the request from the single sign on unit whose validity has been confirmed.

5. The information processing system according to claim 4, wherein
the data management unit registers the authentication information of the external service in an authentication table stored in the storage unit, further in association with identification information of a group for grouping a user of the image forming device, based on the request from the single sign on unit whose validity has been confirmed.

6. The information processing system according to claim 5, wherein
the data management unit provides, to the single sign on unit, the authentication information of the external service that is associated with the identification information of the group, when authentication performed by using the identification information of the group is successful.

7. The information processing system according to claim 1, wherein
the storage unit storing the authentication information of the external service is an information storage device that is connected to the service providing system via the network.

8. An authentication information providing method executed by an information processing system including an image forming device and a service providing system including one or more information processing devices that are connected to the image forming device via a network, the authentication information providing method comprising:
sending a request from a single sign on unit of the image forming device to the service providing system, to acquire authentication information of a plurality of external services provided by a plurality of external service devices that are connected to the image forming device through the network in cooperation with an application operating in the image forming device;
receiving the request from the single sign on unit whose validity has been confirmed, based on a result of confirming the validity of the single sign on unit obtained by using identification information of the single sign on unit, in the service providing system; and
acquiring the authentication information of the external service from a storage unit based on the request from the single sign on unit whose validity has been confirmed, said storage unit being configured to have a setting information table including the authentication information of the plurality of external services, and providing the authentication information of the plurality of external services to the single sign on unit.

9. The information processing system according to claim 1, wherein the setting information table includes the authentication information of the plurality of external services in association with application ID, tenant ID and user ID of the image forming device, and the data management unit is configured to provide the authentication information of the plurality of external services in association with the application ID, the tenant ID and the user ID of the image forming device to the single sign on unit via the access control unit.

10. The information processing system according to claim 1, wherein the authentication information includes an encoded user ID and an encoded password of the plurality of external services.

* * * * *